US011559777B2

(12) United States Patent
Woelfle et al.

(10) Patent No.: US 11,559,777 B2
(45) Date of Patent: Jan. 24, 2023

(54) MICROENCAPSULATED POLYADDITION CATALYST

(71) Applicant: Construction Research & Technology GmbH, Trostberg (DE)

(72) Inventors: Heimo Woelfle, Traunstein (DE); Roland Hinrich Staff, Ludwigshafen (DE); Kristina Brandt, Trostberg (DE); Francisco Javier Lopez-Villanueva, Ludwigshafen (DE)

(73) Assignee: Construction Research & Technology GmbH, Trostberg (DE)

( * ) Notice: Subject to any disclaimer, the term of this patent is extended or adjusted under 35 U.S.C. 154(b) by 488 days.

(21) Appl. No.: 16/492,432

(22) PCT Filed: Mar. 8, 2018

(86) PCT No.: PCT/EP2018/055701
§ 371 (c)(1),
(2) Date: Sep. 9, 2019

(87) PCT Pub. No.: WO2018/162615
PCT Pub. Date: Sep. 13, 2018

(65) Prior Publication Data
US 2020/0038830 A1 Feb. 6, 2020

(30) Foreign Application Priority Data
Mar. 9, 2017 (EP) .................... 17160135

(51) Int. Cl.
*B01J 13/18* (2006.01)
*B01J 23/04* (2006.01)
*B01J 23/16* (2006.01)
*B01J 31/02* (2006.01)
*C08F 222/10* (2006.01)
*C08F 220/08* (2006.01)
*C08F 220/14* (2006.01)
*B01J 31/16* (2006.01)
*C08L 25/14* (2006.01)

(52) U.S. Cl.
CPC ............ *B01J 13/185* (2013.01); *B01J 23/04* (2013.01); *B01J 23/16* (2013.01); *B01J 31/0209* (2013.01); *B01J 31/0237* (2013.01); *B01J 31/0267* (2013.01); *B01J 31/1691* (2013.01); *C08F 220/08* (2013.01); *C08F 220/14* (2013.01); *C08F 222/102* (2020.02); *C08L 25/14* (2013.01)

(58) Field of Classification Search
None
See application file for complete search history.

(56) References Cited

U.S. PATENT DOCUMENTS

| 5,596,051 | A | 1/1997 | Jahns et al. |
| 5,972,508 | A | 10/1999 | Boeckh et al. |
| 6,200,681 | B1 | 3/2001 | Jahns et al. |
| 6,849,591 | B1* | 2/2005 | Boeckh ............... C11D 3/3761 510/101 |
| 7,572,397 | B2 | 8/2009 | Jahns et al. |
| 2006/0078741 | A1* | 4/2006 | Ramalingam, Jr. .... C08G 18/10 428/411.1 |
| 2015/0361227 | A1 | 12/2015 | Schmidt et al. |
| 2016/0145459 | A1 | 5/2016 | Klein et al. |

FOREIGN PATENT DOCUMENTS

| DE | 4321205 | A1 | 1/1995 |
| DE | 19932144 | A1 | 1/2001 |
| EP | 0839902 | A2 | 5/1998 |
| EP | 1029018 | A1 | 8/2000 |
| EP | 1321182 | A1 | 6/2003 |
| WO | 1999/024525 | A1 | 5/1999 |
| WO | 2013/092158 | A2 | 6/2013 |
| WO | 2014/127951 | A1 | 8/2014 |
| WO | 2014/198531 | A1 | 12/2014 |

OTHER PUBLICATIONS

PCT/EP2018/055701—International Search Report, dated May 22, 2018.
EP 17160135.4—European Search Report, dated Aug. 11, 2017.
Ann-Christin Bijlard, et al., "A Nanocapsule-Based Approach Toward Physical Thermolatent Catalysis," Advanced Materials, May 11, 2016, pp. 6372-6377, vol. 28, Issue 30.

* cited by examiner

*Primary Examiner* — Jeffrey D Washville
(74) *Attorney, Agent, or Firm* — Curatolo Sidoti & Trillis Co., LPA; Salvatore A. Sidoti; Brittany L. Kulwicki

(57) ABSTRACT

A microencapsulated polyaddition catalyst comprises a capsule core, containing polyaddition catalyst, and an acrylic copolymer capsule shell, the acrylic copolymer comprising copolymerized units of an intermolecular anhydride of an ethylenically unsaturated $C_3$-$C_{12}$ carboxylic acid. The polyaddition catalyst is selected from acyclic tertiary amines, alicyclic tertiary amines, N-alkylimidazoles, phosphines and organic metal salts. It is suitable for catalysing the reaction of a polyol compound with a polyisocyanate compound. The polyaddition catalyst is released by a chemical stimulus, such as on contact with polyols or water, for example.

18 Claims, No Drawings

MICROENCAPSULATED POLYADDITION CATALYST

CROSS REFERENCE TO RELATED APPLICATIONS

This application is a national stage application of International Application No. PCT/EP2018/055701, filed 8 Mar. 2018, which claims priority from European Patent Application No. 17160135.4, filed 9 Mar. 2017, which applications are incorporated herein by reference.

The present invention relates to a microencapsulated polyaddition catalyst, a method for producing it and its use.

In the construction and manufacturing industries, components are often fixed, or surfaces coated, using chemically curing resins that take the form of one- or two-component systems. Desirable when employing these resins is an optimization in the cure time, which is a composite of two points in time. The opening time (also called gel time or pot life) is the period in which the reactive system can be processed unaffected, while the dry time gives the point in time of tack-free curing. The pot life ought on the one hand to be as long as possible, in order, for example, to permit rational working by extensive application of the resin and, optionally, subsequent joining of components within a time required for the operation. On the other hand, the cure time ought to be extremely short, so that the bonds rapidly cure, the components do not shift relative to one another, subsequent soiling is avoided and/or earlier use is made possible, such as capacity of floor coatings to receive traffic, for example.

Resins are customarily cured using catalysts which catalyse a polymerization reaction, such as a polyaddition reaction, between the reactive resin components. With the majority of conventional resin systems, a continuous increase in viscosity is observed, with the open time often being reached after just a time which is unfavourably short for the user, and with the dry time nevertheless extending to an unwanted length.

Attempts have already been made to encapsulate polyaddition catalysts, thereby delaying the release of the catalysts, with rapid through-curing taking place only when the catalyst is released. Through the nature of the capsules in terms of size, type and thickness of walls, etc., it is possible to define and optimize the time prior to release—that is, the open time.

Adv. Mater. 2016, DOI: 10.1002/adma.201600830 describes the production of thermolatent catalyst nanocapsules. The capsule core consists of isooctane and dimethyltin neodecanoate, the capsule shell of poly(methyl methacrylate-co-butyl methacrylate-co-methacrylic acid) which is crosslinked via butanediol dimethacrylate.

The capsules are produced by a miniemulsion technique. The only stimulus described for the release of catalyst is the thermal opening of the capsules, which prevents use at ambient temperature, such as in floor coatings or sealing membranes.

It is an object of the present invention to provide microencapsulated polyaddition catalysts which are released by a chemical stimulus, such as on contact with isocyanate-curing substances such as polyols or water, for example.

The object is achieved by means of a microencapsulated polyaddition catalyst which comprises a capsule core, containing polyaddition catalyst, and an acrylic copolymer capsule shell, the acrylic copolymer comprising copolymerized units of an intermolecular anhydride of an ethylenically unsaturated carboxylic acid. The polyaddition catalyst is selected from acyclic tertiary amines, dicyclic tertiary amines, N-alkylimidazoles, phosphines and organic metal salts.

The copolymerized units of the intermolecular anhydride of an ethylenically unsaturated carboxylic acid act as temporary crosslinkers, whose crosslinking action is halted by solvolysis of the anhydride bond in the application environment, thereby destabilizing the capsule shell and releasing the capsule contents including the polyaddition catalyst.

The average particle size D(0,5) of the microcapsules used according to the invention (volume-weighted average, determined by means of light scattering) is preferably 1 to 50 µm, more preferably 1 to 20 µm, more particularly from 2 to 10 µm. D(0,5) here is defined as the particle diameter at which a cumulative particle volume of 50% is reached. Capsules with this diameter have sufficient mechanical stability to be able to be handled without damage and incorporated without damage into the compositions that are to be cured. The size is selected such that unintended breakage of individual capsules can be tolerated, since the unintended breakage of individual capsules releases only a small amount of polyaddition catalyst, not leading to the premature hardening of the compositions. On the other hand, a quantity of catalyst sufficient for complete curing is introduced by means of a readily manageable volume of capsules.

In certain embodiments the microencapsulated polyaddition catalyst takes the form of a dry powder, granules or agglomerate.

The weight ratio of capsule core to capsule shell is generally from 50:50 to 95:5, preferably from 60:40 to 94:6, especially preferably from 70:30 to 93:7.

Polyaddition catalysts which can be used are urethanization catalysts which are customarily used in polyurethane chemistry. These are compounds which accelerate the reaction of the reactive hydrogen atoms of isocyanate-reactive components with the organic polyisocyanates.

Polyaddition catalysts contemplated include acyclic tertiary amines, alicyclic tertiary amines, N-alkylimidazoles, phosphines and organic metal salts.

Acyclic tertiary amines are compounds which have at least one tertiary amine function which is not part of a cyclic structure. Examples thereof include triethylamine, tributylamine, N,N-dimethylcyclohexylamine (DMCHA), N-methyldicyclohexylamine, N,N-dimethylbenzylamine (BDMA), N,N-dimethylaminopropylamine, bis(dimethylaminopropyl)amine, N,N-dimethylaminopropyl-N'-methylethanolamine, dimethylaminoethoxyethanol, bis(dimethylaminopropyl)amino-2-propanol, N,N-dimethylaminopropyldipropanolamine, N,N,N'-trimethyl-N'-hydroxyethyl bisaminoethyl ether, N,N-dimethylaminopropylurea, N,N,N',N'-tetramethylethylenediamine, N,N,N',N'-tetramethylbutylenediamine, N,N,N',N'-tetramethyl-1,6-hexylenediamine, N,N,N',N",N"-pentamethyldiethylenetriamine (PMDETA), N,N,N',N",N"-pentamethyldipropylene-triamine (PMDPTA), N,N,N-tris(3-dimethylaminopropyl)amine, bis(2-dimethylaminoethyl) ether (BDMAEE), bis(dimethylaminopropyl)urea, 2,4,6-tris(dimethylamino-methyl)phenol, and also its salt with 2-ethylhexanoic acid and isomers thereof; and also tris(dialkylamino)-s-hexahydrotriazines, such as 1,3,5-tris(3-[dimethylamino]propyl)-hexahydrotriazine.

Acyclic tertiary amines are compounds which have at least one tertiary amine function which is part of a non-aromatic cyclic structure. Examples thereof include 1,4-dimethylpiperazine (DMP), 1-methyl-4-(2-dimethylaminoethyl)piperazine, 1-azabicyclo[3.3.0]octane, 1,4- diazabicyclo[2.2.2]octane (DABCO), 1,8-diazabicyclo[5.4.0]undec-7-ene (DBU), 1,5-diazabicyclo[4.3.0]non-7-ene (DBN), N-methylmorpholine, N-ethylmorpholine, N-cyclohexylmorpholine and 2,2'-dimorpholinodiethyl ether (DMDEE).

Suitable N-alkylimidazoles include N-methylimidazole, 1,2-dimethylimidazole, N-(2-hydroxypropyl)imidazole, N-(2-hydroxyethyl)imidazole and N-(2-aminopropyl)imidazole.

Phosphines contemplated as polyaddition catalysts are preferably tertiary phosphines, such as triphenylphosphine or methyldiphenylphosphine.

Organic metal salts contemplated as polyaddition catalysts preferably have the general formula

$L_m M^{n+} nA^-$ in which the ligand L is an organic radical or an organic compound selected from alkyl, alkenyl, alkynyl, aryl, arylalkyl, alkylaryl, heteroaryl, heteroarylalkyl, alkylheteroaryl and acyl, the ligand L having 1 to 20 C atoms, and the m ligands L being either identical or different, m is 0, 1, 2, 3, 4, 5 or 6, M is a metal, n is 1, 2, 3 or 4, and the anion $A^-$ is a carboxylate ion, alkoxylate ion or enolate ion.

The metal M is preferably selected from lithium, potassium, caesium, magnesium, calcium, strontium, barium, boron, aluminium, indium, tin, lead, bismuth, cerium, cobalt, iron, copper, lanthanum, manganese, mercury, scandium, titanium, zinc and zirconium; more particularly from lithium, potassium, caesium, tin, bismuth, titanium, zinc and zirconium.

The ligand L is preferably alkyl having 1 to 20 C atoms. More preferably L is alkyl having 1 to 10 C atoms, especially 1 to 4 C atoms, e.g. methyl, ethyl, n-propyl, isopropyl, n-butyl, isobutyl, sec-butyl or tert-butyl.

The carboxylate ion preferably has the formula $R^1$—COO$^-$, where $R^1$ is selected from H, alkyl, alkenyl, alkynyl, aryl, arylalkyl, alkylaryl, heteroaryl, heteroarylalkyl, alkylheteroaryl and acyl, and where the radical $R^1$ has up to 20 C atoms, preferably 6 to 20 C atoms. Particularly preferred carboxylate ions are selected from the anions of natural and synthetic fatty acids, such as neodecanoate, isooctanoate and laurate, and the anions of resin acids and naphthenic acids.

The enolate ion preferably has the formula $R^2CH=CR^3$—$O^-$, where $R^2$ and $R^3$ are each selected from H, alkyl, alkenyl, alkynyl, aryl, arylalkyl, alkylaryl, heteroaryl, heteroarylalkyl, alkylheteroaryl and acyl, and where the radicals $R^2$ and $R^3$ each have up to 20 C atoms. Specific examples are ethylacetonate, heptylacetonate or phenylacetonate. The enolate ion derives preferably from a 1,3-diketone having five to eight C atoms. Possible examples include acetylacetonate, the enolate of 2,4-hexanedione, the enolate of 3,5-heptanedione and the enolate of 3,5-octanedione.

The alkoxylate ion preferably has the formula $R^4$—$O^-$, where $R^4$ is selected from alkyl, alkenyl, alkynyl, aryl, arylalkyl, alkylaryl, heteroaryl, heteroarylalkyl, alkylheteroaryl and acyl, and where the radical $R^4$ has up to 20 C atoms.

In certain embodiments the organic metal compound is selected from alkali metal carboxylates, such as lithium ethylhexanoate, lithium neodecanoate, potassium acetate, potassium ethylhexanoate, caesium ethylhexanoate;

alkaline earth metal carboxylates, such as calcium ethylhexanoate, calcium naphthenate, calcium octoate (available as Octa-Soligen® Calcium from OMG Borchers), magnesium stearate, strontium ethylhexanoate, barium ethylhexanoate, barium naphthenate, barium neodecanoate;

aluminium compounds, such as aluminium acetylacetonate, aluminium dionate (e.g. K-KAT® 5218 from King Industries);

zinc compounds, as for example zinc(II) diacetate, zinc(II) ethylhexanoate and zinc(II) octoate, zinc neodecanoate, zinc acetylacetonate;

tin compounds, such as tin(II) carboxylates, examples being tin(II) acetate, tin(II) octoate, tin(II) ethylhexanoate, tin(II) neodecanoate, tin(II) isononanoate, tin(II) laurate, and dialkyltin(IV) salts of organic carboxylic acids, examples being dimethyltin diacetate, dibutyltin diacetate, dibutyltin dibutyrate, dibutyltin bis(2-ethylhexanoate), dibutyltin dilaurate, dibutyltin maleate, dioctyltin dilaurate and dioctyltin diacetate, especially dibutyltin dilaurate;

titanium compounds, such as tetra(2-ethylhexyl) titanate;

zirconium compounds, such as zirconium ethylhexanoate, zirconium neodecanoate, zirconium acetylacetonate (e.g. K-KAT® 4205 from King Industries); zirconium dionates (e.g. K-KAT® XC-9213; XC-A 209 and XC-6212 from King Industries); zirconium 2,2,6,6-tetramethyl-3,5-heptanedionate;

bismuth compounds, such as bismuth carboxylates, especially bismuth octoate, bismuth ethylhexanoate, bismuth neodecanoate or bismuth pivalate (e.g. K-KAT® 348, XC-B221, XC-C227, XC 8203 from King Industries, TIB KAT 716, 716LA, 716XLA, 718, 720, 789 from TIB Chemicals, and those from Shepherd Lausanne);

manganese salts, such as manganese neodecanoate, manganese naphthenate;

cobalt salts, such as cobalt neodecanoate, cobalt ethylhexanoate, cobalt naphthenate;

iron salts, such as iron ethylhexanoate;

mercury compounds, such as phenylmercury carboxylate.

Preferred organic metal compounds are dibutyltin dilaurate, dioctyltin dilaurate, zinc(II) diacetate, zinc(II) dioctoate, zirconium acetylacetonate and zirconium 2,2,6,6-tetramethyl-3,5-heptanedionate, bismuth neodecanoate, bismuth dioctoate and bismuth ethylhexanoate.

The capsule core preferably comprises a hydrophobic core material as well as the polyaddition catalyst. The accompanying use of a hydrophobic core material allows the production of well-defined capsules of uniform size distribution and facilitates the distribution of the polyaddition catalyst released in the application medium, as soon as the capsule shell has opened.

The polyaddition catalyst accounts preferably for 10 to 100 wt %, e.g. 20 to 90 wt %, more particularly 30 to 70 wt %, based on the total weight of polyaddition catalyst and hydrophobic core material.

Examples of hydrophobic core materials are aliphatic hydrocarbons, aromatic hydrocarbons, halogenated hydrocarbons, saturated or unsaturated $C_6$-$C_{30}$ fatty acids, fatty alcohols, oxo-process alcohols, ethers of fatty alcohols, $C_6$-$C_{30}$ fatty amines, fatty acid esters, triglycerides, esters of aliphatic or aromatic polycarboxylic acids, natural and synthetic waxes, and trialkylphosphoric esters. The hydrophobic core materials may also be used as mixtures of two or more substances.

Examples of suitable substances include the following:

aliphatic hydrocarbons, such as saturated or unsaturated $C_{10}$-$C_{40}$ hydrocarbons, which are branched or, preferably, linear, such as n-tetradecane, n-pentadecane, n-hexadecane, n-heptadecane, n-octadecane, n-nonadecane, n-eicosane, n-heneicosane, n-docosane, n-tricosane, n-tetracosane, n-pentacosane, n-hexacosane, n-heptacosane, n-octacosane and also cyclic hydrocarbons, e.g. cyclohexane, cyclooctane, cyclodecane;

aromatic hydrocarbons, such as benzene, naphthalene, biphenyl, o- or m-terphenyl, $C_1$-$C_{40}$ alkyl-substituted aromatic hydrocarbons such as dodecylbenzene, tetradecylbenzene, hexadecylbenzene, hexylnaphthalene or decylnaphthalene;

halogenated hydrocarbons such as chlorinated paraffin, bromoctadecane, bromopentadecane, bromononadecane, bromoeicosane, bromodocosane;

saturated or unsaturated $C_6$-$C_{30}$ fatty acids such as lauric, stearic, oleic or behenic acid;

fatty alcohols such as lauryl, stearyl, oleyl, myristyl and cetyl alcohol, mixtures such as coconut fatty alcohol, and also the oxo-process alcohols, which are obtained by hydroformylation of a-olefins and further reactions;

$C_6$-$C_{30}$ fatty amines, such as decylamine, dodecylamine, tetradecylamine or hexadecylamine;

fatty acid esters such as $C_1$-$C_{10}$ alkyl esters of fatty acids such as propyl palmitate, methyl stearate or methyl palm itate and also, preferably, their eutectic mixtures, or methylcinnamate;

triglycerides of linear and branched $C_3$-$C_{21}$ carboxylic acids, such as olive oil, soyabean oil, corn oil, cottonseed oil, sunflower oil, peanut oil, palm oil, coconut oil and wheat germ oil;

esters of aliphatic or aromatic polycarboxylic acids, especially esters of adipic acid, sebacic acid, succinic acid, citric acid, acetylcitric acid, cyclohexane-1,2-dicarboxylic acid or phthalic acid, such as di-2-ethylhexyl adipate, di-n-hexyl adipate, di-n-octyl adipate, diisooctyl adipate, di-n-decyl adipate, diisodecyl adipate, ethylhexyl sebacate, diisodecyl sebacate, di-n-butyl phthalate, di-n-octyl phthalate, di-n-hexyl phthalate, di-ndecyl phthalate, dicyclohexyl phthalate, diisodecyl phthalate, butyl cyclohexyl phthalate, diisooctyl phthalate, isooctyl isodecyl phthalate;

natural and synthetic waxes such as montanic acid waxes, montanic ester waxes, carnauba wax, polyethylene wax, oxidized waxes, polyvinyl ether waxes, ethylenevinyl acetate wax or hard Fischer-Tropsch process waxes;

trialkylphosphoric esters, such as trimethyl phosphate.

Of these, esters of aliphatic or aromatic polycarboxylic acids, especially adipic esters, 1,2-cyclohexanedicarboxylic esters, phthalic esters, triglycerides and trialkylphosphoric esters are generally preferred on account of their ready availability and compatibility with the compositions generally cured. A particularly preferred hydrophobic core material is diisononyl 1,2-cyclohexanedicarboxylate.

The acrylic copolymer which constructs the capsule shell comprises copolymerized units of an intermolecular anhydride of an ethylenically unsaturated carboxylic acid, more particularly of an intermolecular anhydride of an ethylenically unsaturated $C_3$-$C_{12}$ carboxylic acid, more preferably of an intermolecular anhydride of an ethylenically unsaturated $C_3$-$C_8$ carboxylic acid. An intermolecular acid anhydride is one which yields two acid molecules on cleavage of the anhydride bond. The intermolecular anhydride may comprise symmetrical or nonsymmetrical anhydrides of the ethylenically unsaturated carboxylic acids. Examples of suitable ethylenically unsaturated carboxylic acids are acrylic acid, methacrylic acid, ethylacrylic acid, allylacetic acid, crotonic acid, vinylacetic acid, vinylbenzoic acid and the like. Also contemplated are the symmetrical or unsymmetrical anhydrides of monoesters of ethylenically unsaturated dicarboxylic acids with one another or with ethylenically unsaturated monocarboxylic acids. Preferred are acrylic anhydride, methacrylic anhydride and 4-vinylbenzoic anhydride, of which methacrylic anhydride is the most preferred.

As well as the units of an intermolecular anhydride from an ethylenically unsaturated carboxylic acid, the acrylic copolymer generally comprises copolymerized units of one or more ethylenically unsaturated monomers different from the anhydride.

In general the acrylic copolymer is constructed of units of
(a) 5 to 50 wt %, preferably 10 to 30 wt %, of at least one intermolecular anhydride of an ethylenically unsaturated $C_3$-$C_{12}$ carboxylic acid,
(b) 30 to 90 wt %, preferably 35 to 80 wt %, of at least one monomer selected from $C_1$-$C_{24}$ alkyl esters of acrylic acid, $C_1$-$C_{24}$ alkyl esters of methacrylic acid and vinylaromatics,
(c) 5 to 20 wt %, preferably 10 to 15 wt %, of at least one monomer which has at least two ethylenic unsaturations, and
(d) 0 to 30 wt %, preferably 0 to 20 wt %, of one or more other monomers, based in each case on the total weight of the monomers.

Preferred monomers (a) are those stated above, especially acrylic anhydride, methacrylic anhydride and 4-vinylbenzoic anhydride, of which methacrylic anhydride is the most preferred.

Suitable monomers (b) are $C_1$-$C_{24}$ alkyl esters of acrylic and/or methacrylic acid. Suitable monomers (b) are isopropyl, isobutyl, sec-butyl and tert-butyl acrylate and the corresponding methacrylates, and also, more preferably, methyl, ethyl, n-propyl and n-butyl acrylate and the corresponding methacrylates. In general the methacrylates are preferred. Further suitable monomers (b) are vinylaromatics, such as styrene or α-Methylstyrene.

In certain embodiments the monomers (b) comprise a combination of at least one monomer having a glass transition temperature Tg of 70° C. or more with at least one monomer having a glass transition temperature Tg of 50° C. or less. A preferred monomer having a glass transition temperature Tg of 70° C. or more is methyl methacrylate; a preferred monomer having a glass transition temperature Tg of 50° C. or less is n-butyl acrylate or n-butyl methacrylate.

Monomers (c) have at least two ethylenic unsaturations. They bring about crosslinking of the capsule shell during the polymerization, and give the capsule shell mechanical stability. Suitable monomers (c) are ethylenically unsaturated monomers which have two, three, four or more nonconjugated ethylenic unsaturations. Preference is given to using monomers having vinyl, allyl, acrylic and/or methacrylic groups. Preferred monomers are those which are insoluble or sparingly soluble in water but have good to limited solubility in the lipophilic substance. Sparing solubility refers to a solubility of less than 60 g/l at 20° C.

Suitable monomers having two ethylenic unsaturations are divinylbenzene and divinylcyclohexane, the diesters of diols with acrylic acid or methacrylic acid, and also the diallyl and divinyl ethers of these diols. Examples include ethanediol diacrylate, ethylene glycol dimethacrylate, 1,3-butylene glycol dimethacrylate, methallylmethacrylamide, allyl acrylate and allyl methacrylate. Particularly preferred are propanediol, butanediol, pentanediol and hexanediol diacrylates and the corresponding methacrylates.

Preferred monomers having three, four or more nonconjugated ethylenic unsaturations are the esters of multiple alcohols with acrylic acid and/or methacrylic acid, and also the allyl and vinyl ethers of these multiple alcohols, trivinylbenzene and trivinylcyclohexane. Multiple alcohols that may be mentioned include, in particular, trimethylol and pentaerythritol. Particularly preferred are trimethylolpropane triacrylate and trimethacrylate, pentaerythritol triallyl ether, pentaerythritol tetraallyl ether, pentaerythritol triacrylate and pentaerythritol tetraacrylate, and also their technical mixtures. Thus pentaerythritol tetraacrylate is generally, in technical mixtures, in a mixture with pentaerythritol triacrylate and minor amounts of oligomerization products.

Particularly preferred monomers (c) are 1,4-butanediol diacrylate, pentaerythritol triacrylate, pentaerythritol tetraacrylate and triethylene glycol dimethacrylate.

Optional monomers (d) contemplated are other monomers, different from the monomers (a) to (c), such as vinyl acetate, vinyl propionate, vinylpyridine, acrylic acid, methacrylic acid, maleic acid, itaconic acid, vinylphosphonic acid, maleic anhydride, 2-hydroxyethyl acrylate and methacrylate, acrylamido-2-methylpropanesulphonic acid, methacrylonitrile, acrylonitrile, methacrylamide, N-vinylpyrrolidone, N-methylol-acrylamide, N-methylolmethacrylamide, dimethylaminoethyl methacrylate and diethylaminoethyl methacrylate.

The acrylic copolymer is obtainable in a variety of ways, but is obtained preferably by free radical suspension polymerization in an oil-in-water emulsion or water-in-oil emulsion. The choice between an oil-in-water or water-in-oil regime will be made by the skilled person according to the hydrophilicity or lipophilicity of the catalyst to be encapsulated. One method for free radical suspension polymerization in a water-in-oil emulsion is described in WO 2013/092158 and WO 2014/198531, for example, which are referenced in their entirety.

The microcapsules are preferably obtainable by polymerization of a monomer mixture constituting the capsule shell in the oil phase of a stable oil-in-water emulsion, the oil phase consisting of a hydrophobic material which comprises a polyaddition catalyst. This production method is known per se and described in DE 4321205 or WO 2014/127951, for example.

The core of the microcapsules is formed by a hydrophobic material which is emulsifiable in water. The hydrophobic material serves simultaneously as solvent or dispersant for the monomer mixture used in the production of the capsule shells by polymerization. The polymerization then takes place in the oil phase of a stable oil-in-water emulsion. This emulsion is obtained by, for example, first dissolving the monomers and the polymerization initiator and also, optionally, a chain transfer agent in the hydrophobic material, and emulsifying the resulting solution in an aqueous medium containing an emulsifier and/or protective colloid. An alternative possibility is first to emulsify the hydrophobic phase or constituents thereof in the aqueous phase and then to add the monomers or the polymerization initiator and also the auxiliaries still to be used, optionally, such as protective colloids or chain transfer agents, to the emulsion. In another variant of the method, the hydrophobic material and the monomers can also be emulsified in water and then just the polymerization initiator added. Since the hydrophobic material is to be microencapsulated as fully as possible in the emulsion, the hydrophobic materials employed are preferably only those having limited solubility in water. The solubility ought preferably not to exceed 5 wt % at 25° C. For complete encapsulation of the hydrophobic material in the oil phase of the oil-in-water emulsion, it is useful to select the monomers in accordance with their solubility in the hydrophobic material. Whereas the monomers are substantially soluble in the oil, they produce, on polymerization in the individual oil droplets, oligomers and polymers which are soluble neither in the oil phase nor in the water phase of the oil-in-water emulsion, and which migrate to the interface between the oil droplets and the water phase. There, in the course of the further polymerization, they form the wall material, which ultimately envelopes the hydrophobic material as the core of the microcapsules.

In order to form a stable oil-in-water emulsion, it is usual to use protective colloids and/or Pickering stabilizers as well. Both protective colloids and Pickering stabilizers may be ionic or neutral. Protective colloids and Pickering stabilizers may be used either individually or in mixtures of two or more representatives with identical or different charge.

Protective colloids are preferably water-soluble polymers which lower the surface tension of the water from a maximum of 73 mN/m to 45 to 70 mN/m and thus ensure the formation of closed capsule walls.

Anionic protective colloids are sodium alginate, polymethacrylic acid and copolymers thereof, the copolymers of sulphoethyl acrylate and methacrylate, of sulphopropyl acrylate and methacrylate, of N-(sulphoethyl)maleimide, of 2-acrylamido-2-alkylsulphonic acids, styrenesulphonic acid and also of vinylsulphonic acid. Preferred anionic protective colloids are naphthalenesulphonic acid and naphthalenesulphonic acid-formaldehyde condensates and also, in particular, polyacrylic acids and phenolsulphonic acid-formaldehyde condensates.

Neutral protective colloids are, for example, cellulose derivatives such as hydroxyethylcellulose, methylhydroxyethylcellulose, methylcellulose and carboxymethylcellulose, polyvinylpyrrolidone, copolymers of vinylpyrrolidone, gelatin, gum arabic, xanthan, casein, polyethylene glycols, polyvinyl alcohol and partially hydrolysed polyvinyl acetates and also methylhydroxypropylcellulose. Preferred neutral protective colloids are polyvinyl alcohol and partially hydrolysed polyvinyl acetates and also methylhydroxy-$(C_1$-$C_4)$-alkylcellulose.

By methylhydroxy-$(C_1$-$C_4)$-alkylcellulose is meant methylhydroxy-$(C_1$-$C_4)$-alkylcelluloses of a wide variety of different degrees of methylation and of alkoxylation. The preferred methylhydroxy-$(C_1$-$C_4)$-alkylcelluloses possess an average degree of substitution DS of 1.1 to 2.5 and a molar degree of substitution MS of 0.03 to 0.9.

Examples of suitable methylhydroxy-$(C_1$-$C_4)$-alkylcelluloses are methylhydroxy-ethylcellulose or methylhydroxypropylcellulose. Particularly preferred is methylhydroxypropylcellulose. Methylhydroxy-$(C_1$-$C_4)$-alkylcelluloses of these kinds are available for example under the trade name Culminal® from Hercules/Aqualon.

Pickering stabilizers are inorganic solid particles. A Pickering system of this kind may consist of the solid particles alone or additionally of auxiliaries which enhance the dispersibility of the particles in water or enhance the wettability of the particles by the lipophilic phase. The mode of action and deployment thereof are described in EP-A-1 029 018 and also EP-A-1 321 182, whose content is expressly incorporated by reference.

The inorganic solid particles may be metal salts, such as salts, oxides and hydroxides of calcium, magnesium, iron, zinc, nickel, titanium, aluminium, silicon, barium and manganese. They include magnesium hydroxide, magnesium carbonate, magnesium oxide, calcium oxalate, calcium carbonate, barium carbonate, barium sulphate, titanium dioxide, aluminium oxide, aluminium hydroxide and zinc sulphide. Silicates, bentonite, hydroxyapatite and hydrotalcites may likewise be mentioned. Particularly preferred are $SiO_2$-based silicas, magnesium pyrophosphate and tricalcium phosphate.

Suitable $SiO_2$-based Pickering stabilizers are finely divided silicas. They can be dispersed as fine, solid particles in water. It is also possible, however, to use what are called colloidal dispersions of silica in water. Such colloidal dispersions are alkaline, aqueous mixtures of silica. In the alkaline pH range, the particles are swollen and are stable in water. For these dispersions to be used as Pickering stabilizers, it is advantageous if the pH of the oil-in-water emulsion is adjusted with an acid to a pH of 2 to 7. Preferred colloidal dispersions of silica have, at a pH of 9.3, a specific surface area in the range from 70 to 90 $m^2/g$.

Preferred $SiO_2$-based Pickering stabilizers are finely divided silicas whose average particle sizes are in the range from 40 to 150 nm at pH levels in the range from 8 to 11. Examples include Levasil® 50/50 (H. C. Starck), Köstrosol® 3550 (CWK Bad Köstritz) and Bindzil® 50/80 (Akzo Nobel Chemicals).

The polymerization takes place in general in the presence of radical-forming polymerization initiators. For this purpose it is possible to use all customary peroxo compounds and azo compounds in the amounts customarily employed, of 0.1 to 5 wt %, for example, based on the weight of the monomers to be polymerized. Preferred polymerization initiators are those which are soluble in the oil phase or in the monomers. Examples of such are t-butyl peroxyneodecanoate, t-butyl peroxypivalate, t-amyl peroxypivalate, dilauroyl peroxide, t-amyl peroxy-2-ethylhexanoate and the like.

The polymerization of the oil-in-water emulsion is carried out customarily at 20 to 100° C., preferably at 40 to 90° C. The polymerization is customarily performed under atmospheric pressure, but may also take place under reduced or increased pressure, in the range from 0.5 to 20 bar, for example. A useful procedure is to emulsify a mixture of water, protective colloid and hydrophobic materials, polymerization initiators and monomers to the desired droplet size of the hydrophobic material, using a high-speed disperser, and to heat the stable emulsion with stirring to the decomposition temperature of the polymerization initiator. The rate of the polymerization in this case can be controlled through the choice of the temperature and the quantity of the polymerization initiator, in a known manner. When the polymerization temperature is reached, it is useful to continue the polymerization for some further time, such as 2 to 6 hours, for example, in order to complete the conversion of the monomers.

In a particularly preferred operation, the temperature of the polymerizing reaction mixture is raised continuously or periodically during the polymerization. This is done by means of a programme with ascending temperature. For this purpose, the overall polymerization time can be subdivided into 2 or more periods. The first polymerization period is marked by slow decomposition of the polymerization initiator. In the second polymerization period and any further polymerization periods, the temperature of the reaction mixture is raised in order to accelerate the decomposition of the polymerization initiators. The temperature may be raised in one step or in two or more steps or continuously in a linear or nonlinear manner. The temperature difference between the start and the end of the polymerization may be up to 50° C. In general this difference is 3 to 40° C., preferably 3 to 30° C. After the end of polymerization, the microcapsule dispersion is cooled to room temperature.

If the microcapsule dispersion is to be stored for a relatively long time, it is possible to add thickeners, such as Rheovis® AS 1125, Rheovis® AT 120, Rheovis® AS 1130 (available from BASF SE, Germany) or xanthan, in order to stabilize the suspension and prevent creaming.

The microcapsule dispersions obtained by the procedure outlined above can be spray-dried in a customary way. To facilitate the redispersing of the spray-dried microcapsules, it is possible, optionally, for additional quantities of emulsifier and/or protective colloid to be added to the dispersions prior to spray drying. The spray drying of the microcapsule dispersion may take place in a customary way. In general the procedure involves the entry temperature of the drying gas, generally nitrogen or air, being in the range from 100 to 200° C., preferably 120 to 160° C., and the exit temperature of the drying gas being in the range from 30 to 90° C., preferably 60 to 80° C. The spraying of the aqueous microcapsule dispersion in the stream of drying gas may take place, for example, by means of single-fluid or multi-fluid nozzles or via a rotating disc. The microcapsule dispersion is fed in customarily in the range from 2 to 200 bar. The use of a single-fluid nozzle with swirl generator is advantageous. Via the selection of the swirl generator it is possible additionally to influence droplet size and spraying angle. For example, single-fluid nozzles from Delavan can be used that have a typical construction consisting of swirl chamber, which influences the spraying angle, and perforated plate, which influences the throughput.

The particulate microcapsule composition is normally deposited using cyclones or filter separators. The sprayed aqueous microcapsule dispersion and the stream of drying gas are preferably guided in parallel. The drying gas stream is preferably blown from above into the tower cocurrently with the microcapsule dispersion.

As a spraying tower it is possible to make use, for example, of dryers from Anhydro, Miro or Nubilosa which have tower heights of 12 to 30 metres and widths of 3 to 8 metres. The throughput of drying gas for such spraying towers is typically in the range from 20 to 30 t/h. The throughput of microcapsule dispersion in that case is generally 1 to 1.5 t/h.

According to one process variant it is possible to insert a fluidized bed downstream of the dryer, in order to remove any residual moisture. Processes where spray drying is followed by fluidized bed drying are preferred, since they lead to a microcapsule composition having a smaller fines fraction.

The microencapsulated polyaddition catalyst of the invention is suitable for curing addition resins, such as polyurethane, polyurea or epoxy systems, for example.

The microencapsulated polyaddition catalyst of the invention is suitable for use in the construction industry, preferably in floor coatings, sealants, adhesives and sealing membranes.

The microencapsulated polyaddition catalyst of the invention is particularly suitable for catalysing the reaction of a polyol compound with a polyisocyanate compound.

The most important polyisocyanate compounds are isomer mixtures and prepolymers of diphenylmethane diisocyanate (MDI). Utilized additionally are oligomers and/or adducts of hexamethylene diisocyanate (HDI) and isophorone diisocyanate (IPDI) and also prepolymers of toluene diisocyanate (TDI) and of isophorone diisocyanate (IPDI).

Reaction partners available include polyhydroxy compounds, but also aromatic and sterically hindered aliphatic amines, and also latent hardeners. The latter are converted into reactive products by exposure to moisture. Moreover, with the conventional one-component systems (1K PU), the reaction of the polyurethane prepolymers with moisture is utilized for polymer formation.

The microencapsulated polyaddition catalyst of the invention is also suitable for use with polyol dispersions. In this case it is possible to cover a broad range of film thicknesses. For high film thicknesses, it is usual to use cement and/or slaked lime (so-called 3K systems), in order to scavenge the carbon dioxide that is produced on exposure to water. Coatings of this kind are notable for extremely high chemical resistance.

The microencapsulated polyaddition catalyst of the invention can be admixed to the polyisocyanate compound. Alternatively the microencapsulated polyaddition catalyst of the invention can be mixed with the components of the resin system at the time of application. In one preferred embodiment, the microencapsulated polyaddition catalyst of the invention is admixed to the aggregate system or filler system. The aggregate or filler system is generally in powder form and is mixed with the liquid components of the resin system at the time of application.

The microencapsulated polyaddition catalyst of the invention allows a sufficiently long pot life and a short cure time to be set.

The invention is illustrated more closely by the examples hereinafter.

The particle size distribution of the microcapsules was measured using a Malvern Mastersizer 2000, Hydro 2000S sample dispersion unit, with standard measurement methods, which are documented in the literature. The specified value is the average value i.e. D(0,5).

For freeze drying, the samples were frozen on dry ice in a metal tray having a depth of 25 mm. Drying takes place at 1.013 mbar in a Christ Alpha 2-4 freeze dryer with LDC-1M temperature controller. The sample temperature was regulated at −20° C. The temperature of the ice condenser was <−60° C. The drying operation was ended when the temperature both of the sample and of the substrate was <0° C. The drying time is dependent on the quantity and physical nature of the material being dried. After drying has been carried out, the apparatus is aerated with ambient air and the samples are scraped from the mould using a spatula and dispensed.

EXAMPLE 1

Water Phase
463.15 g of distilled water
150 g of a 10 wt % aqueous solution of polyvinyl alcohol (Mowiol 18/88 from Kuraray Europe GmbH, viscosity of a 4 wt % solution at 20° C.: 18 mPas as measured to DIN 53015, with a degree of hydrolysis of 88%)
2 g of a 2.5 wt % aqueous solution of sodium nitrite
0.12 g of a 25 wt % aqueous solution of sodium hydroxide
Feed 1
200 g of dibutyltin dilaurate
200 g of diisononyl cyclohexane-1,2-dicarboxylate
Feed 2
10 g of 1,4-butanediol diacrylate
50 g of methyl methacrylate
40 g of methacrylic anhydride
Feed 3
2.05 g of tert-butyl peroxyneodecanoate
Feed 4
10 g of a 10 wt % aqueous solution of tert-butyl hydroperoxide
Feed 5
26 g of a 3.85 wt % aqueous solution of ascorbic acid The water phase was introduced into a receiver vessel at 25° C. Feed 1 and feed 2 were added and the mixture was stirred at 3500 rpm for 40 minutes. A stable emulsion was formed. After the addition of feed 3, the following temperature programme was run: heating 75° C. in 180 minutes, holding of this temperature for 60 minutes. Thereafter feed 4 was added, and, in the course of cooling to 20° C., feed 5 was added over a period of 60 minutes.

This gave a dispersion having a solids content of 45.2 wt % with an average particle size D(0,5) of 2.54 μm. The dispersion was subsequently freeze-dried to remove the water. In this case a colourless powder was obtained.

EXAMPLE 2

Example 1 was repeated, but the amounts of the following components were modified as follows:
70 g of methyl methacrylate
20 g of methacrylic anhydride This gave a dispersion having a solids content of 44.8 wt % with an average particle size D(0,5) of 2.25 μm. The dispersion was subsequently freeze-dried to remove the water. In this case a colourless powder was obtained.

EXAMPLE 3

Water phase
570.7 g of distilled water
150 g of a 50 wt % aqueous solution of a silica sol having a specific surface area of about 80 m²/g
7 g of a 5 wt % aqueous solution of methylhydroxypropylcellulose having an average molecular weight of 26 000 g/mol
2 g of a 2.5 wt % aqueous solution of sodium nitrite
3.85 g of a 20 wt % aqueous solution of nitric acid
Feed 1
200 g of dibutyltin dilaurate
200 g of diisononyl cyclohexane-1,2-dicarboxylate
Feed 2
10 g of 1,4-butanediol diacrylate
50 g of methyl methacrylate
40 g of methacrylic anhydride
Feed 3
1.35 g of a 75 wt % solution of tert-butyl perpivalate in aliphatic hydrocarbons
Feed 4
50 g of a 2 wt % aqueous solution of sodium peroxodisulphate
Feed 5
14.4 g of a 10 wt % aqueous solution of sodium hydroxide The water phase was introduced into a receiver vessel at 25° C. Feed 1 and feed 2 were added and the mixture was stirred at 3500 rpm for 40 minutes. A stable emulsion was formed. After the addition of feed 3, the following temperature programme was run: heating to 65° C. in 60 minutes, heating to 90° C. in 60 minutes, holding of this temperature for 150 minutes. In the first 90 minutes of this period, feed 4 was added. After cooling to 20° C., feed 5 was added.

This gave a dispersion having a solids content of 44.6 wt % with an average particle size D(0,5) of 4.00 μm. The dispersion was subsequently freeze-dried to remove the water. In this case a colourless powder was obtained.

EXAMPLE 4

Example 3 was repeated, but the amounts of the following components were modified as follows:
70 g of methyl methacrylate
20 g of methacrylic anhydride
0.73 g of sodium hydroxide
This gave a dispersion having a solids content of 44.7 wt % with an average particle size D(0,5) of 4.16 μm. The dispersion was subsequently freeze-dried to remove the water. In this case a colourless powder was obtained.

EXAMPLE 5

Water Phase
570.7 g of distilled water
150 g of a 50 wt % aqueous solution of a silica sol having a specific surface area of about 80 m²/g
7 g of a 5 wt % aqueous solution of methylhydroxypropylcellulose having an average molecular weight of 26 000 g/mol
2 g of a 2.5 wt % aqueous solution of sodium nitrite
3.85 g of a 20 wt % aqueous solution of nitric acid
Feed 1
200 g of bismuth neodecanoate
200 g of diisononyl cyclohexane-1,2-dicarboxylate
Feed 2
10 g of 1,4-butanediol diacrylate
70 g of methyl methacrylate
20 g of methacrylic anhydride
Feed 3
1.35 g of a 75 wt % solution of tert-butyl perpivalate in aliphatic hydrocarbons
Feed 4
50 g of a 2 wt % aqueous solution of sodium peroxodisulphate
Feed 5
0.73 g of a 10 wt % aqueous solution of sodium hydroxide
The method was identical to that stated in experiment 4. This gave a dispersion having a solids content of 42.5 wt % with an average particle size D(0,5) of 3.64 μm. The dispersion was subsequently freeze-dried to remove the water. In this case a colourless powder was obtained.

Examples 1 to 5 were tested with the following procedure:
Test system: a masterbatch was prepared from 91 g (0.5 mol of NCO) of Desmodur N3600 (HDI trimer) and 124 g (0.55 mol of OH) Lupranol 1200 (polypropylene glycol having a number-average molecular weight of 450); 0.15 g of catalyst, or a quantity of microcapsules whose catalyst content corresponds to the free quantity of catalyst, was used for 15 g of masterbatch, corresponding to a catalyst loading of 1% (w/w).

Measurement:
1) Weighing of suitable quantities of the catalyst into snap-lid glass vessels containing a magnetic stirrer
2) Production of the masterbatch by mixing the Desmodur N3600 component from Bayer Material Science and the Lupranol 1200 component from BASF under a slow stream of nitrogen for 5 minutes at 400 rpm.
3) Introducing the mixture into glass sample vessels and carrying out stirring with a magnetic stirrer
4) Pot life: when magnetic stirrer remains at standstill
5) Curing time: when the surface of the resin no longer moved when the glass vessel was tipped, the ultimate curing time was ascertained, as soon as the cured resin could no longer be impressed using a spatula.

Test Outcome:

| | Pot life/min | Curing time/min |
|---|---|---|
| No catalyst | 2880 | 3000 |
| Pure dibutyltin dilaurate catalyst | 10 | 16 |
| Example 1 | 75 | 165 |
| Example 2 | 270 | 1080 |
| Example 3 | 40 | 75 |
| Example 4 | 90 | 270 |
| Pure bismuth neodecanoate catalyst | 1 | 1.2 |
| Example 5 | 180 | 265 |

The invention claimed is:

1. A microencapsulated polyaddition catalyst comprising a capsule core, containing the polyaddition catalyst, and an acrylic copolymer capsule shell, the acrylic copolymer comprising copolymerized units of an intermolecular anhydride of an ethylenically unsaturated $C_3$-$C_{12}$ carboxylic acid, and the polyaddition catalyst being selected from acyclic tertiary amines, alicyclic tertiary amines, N-alkylimidazoles, phosphines and organic metal salts.

2. The microencapsulated polyaddition catalyst according to claim 1, wherein the intermolecular anhydride of the ethylenically unsaturated $C_3$-$C_{12}$ carboxylic acid is selected from acrylic anhydride, methacrylic anhydride and 4-vinylbenzoic anhydride.

3. The microencapsulated polyaddition catalyst according to claim 1, wherein the acrylic copolymer is constructed of units of
   (a) 5 to 50 wt % of at least one intermolecular anhydride of an ethylenically unsaturated $C_3$-$C_{12}$ carboxylic acid,
   (b) 30 to 90 wt % of at least one monomer selected from $C_1$-$C_{24}$ alkyl esters of acrylic acid, $C_1$-$C_{24}$ alkyl esters of methacrylic acid and vinylaromatics,
   (c) 5 to 20 wt % of at least one monomer which has at least two ethylenic unsaturations, and
   (d) 0 to 30 wt % of one or more other monomers,
   based in each case on the total weight of the monomers.

4. The microencapsulated polyaddition catalyst according to claim 1, wherein
   the acyclic tertiary amine is selected from triethylamine, tributylamine, N,N-dimethylcyclohexylamine (DMCHA), N-methyldicyclohexylamine, N,N-dimethylbenzylamine (BDMA), N,N-dimethylaminopropylamine, bis(dimethylaminopropyl)amine, N,N-dimethylaminopropyl-N'-methylethanolamine, dimethylaminoethoxyethanol, bis(dimethylaminopropyl)amino-2-propanol, N,N-dimethylam inopropyldipropanolam ine, N, N, N'-trimethyl-N'-hydroxyethyl bisaminoethyl ether, N,N-dimethylaminopropylurea, N,N,N',N'-tetramethylethylene-diamine, N,N,N',N'-tetramethylbutylenediamine, N,N,N',N'-tetramethyl-1,6-hexylenediamine, N,N,N',N",N"-pentamethyldiethylenetriamine (PMDETA), N,N,N',N",N"-pentamethyldipropylenetriamine (PMDPTA), N,N,N-tris(3-dimethylaminopropyl)amine, bis(2-dimethylaminoethyl) ether (BDMAEE), bis(dimethylaminopropyl)urea, 2,4,6-tris(dimethylaminomethyl)phenol, and also its salt with 2-ethylhexanoic acid and isomers thereof, 1,3,5-tris(3-[dimethyl-amino]propyl)hexahydrotriazine;

the alicyclic tertiary amine is selected from 1,4-dimethylpiperazine (DMP), 1-methyl-4-(2-dimethylaminoethyl)piperazine, 1-azabicyclo[3.3.0]octane, 1,4-diazabicyclo[2.2.2]octane (DABCO), 1,8-diazabicyclo[5.4.0]undec-7-ene (DBU), 1,5-diazabicyclo[4.3.0]non-7-ene (DBN), N-methylmorpholine, N-ethylmorpholine, N-cyclohexylmorpholine and 2,2'-dimorpholinodiethyl ether (DMDEE); and the N-alkylimidazole is selected from N-methylimidazole, 1,2-dimethylimidazole, N-(2-hydroxypropyl)imidazole, N-(2-hydroxyethyl)imidazole and N-(2-am inopropyl)-imidazole.

5. The microencapsulated polyaddition catalyst according to claim 1, wherein the organic metal salt has the general formula

in which the ligand L is an organic radical or an organic compound selected from alkyl, alkenyl, alkynyl, aryl, arylalkyl, alkylaryl, heteroaryl, heteroarylalkyl, alkylheteroaryl and acyl, the ligand L having 1 to 20 C atoms, and the m ligands L being either identical or different, m is 0, 1, 2, 3, 4, 5 or 6, M is a metal, n is 1, 2, 3 or 4, and the anion $A^-$ is a carboxylate ion, alkoxylate ion or enolate ion.

6. The microencapsulated polyaddition catalyst according to claim 5, wherein the metal M is selected from lithium, potassium, caesium, magnesium, calcium, strontium, barium, boron, aluminum, indium, tin, lead, bismuth, cerium, cobalt, iron, copper, lanthanum, manganese, mercury, scandium, titanium, zinc and zirconium.

7. The microencapsulated polyaddition catalyst according to claim 5, wherein the anion $A^-$ is a carboxylate ion of the formula $R^1-COO^-$, where $R^1$ is selected from H, alkyl, alkenyl, alkynyl, aryl, arylalkyl, alkylaryl, heteroaryl, heteroarylalkyl, alkylheteroaryl and acyl, and where the radical $R^1$ has up to 20 C atoms.

8. The microencapsulated polyaddition catalyst according to claim 5, wherein the anion $A^-$ is an enolate ion of the formula $R^2CH=CR^3-O^-$, where $R^2$ and $R^3$ are each selected from H, alkyl, alkenyl, alkynyl, aryl, arylalkyl, alkylaryl, heteroaryl, heteroarylalkyl, alkylheteroaryl and acyl, and where the radicals $R^2$ and $R^3$ each have up to 20 C atoms.

9. The microencapsulated polyaddition catalyst according to claim 1, wherein the capsule core comprises a hydrophobic core material.

10. The microencapsulated polyaddition catalyst according to claim 9, wherein the hydrophobic core material is selected from esters of aliphatic or aromatic polycarboxylic acids, triglycerides and trialkylphosphoric esters.

11. The microencapsulated polyaddition catalyst according to claim 1, wherein the diameter D(0,5) of the microcapsules is between 1 and 50 μm.

12. The microencapsulated polyaddition catalyst according to claim 1, wherein the microencapsulated polyaddition catalyst takes the form of a dry powder, granules or agglomerate.

13. A method for producing a microencapsulated polyaddition catalyst according to claim 1 comprising polymerizing by radical polymerization of a monomer mixture constituting the capsule shell in the oil phase of a stable oil-in-water emulsion, the oil phase containing a polyaddition catalyst, and the monomer mixture containing the intermolecular anhydride of an ethylenically unsaturated $C_3$-$C_{12}$ carboxylic acid.

14. The method according to claim 13, wherein the oil-in-water emulsion is stabilized by a protective colloid and/or a Pickering stabilizer.

15. A method of catalyzing the reaction of a polyol compound with a polyisocyanate compound with a microencapsulated polyaddition catalyst, the microencapsulated polyaddition catalyst comprising a capsule core, containing the polyaddition catalyst, and an acrylic copolymer capsule shell, the acrylic copolymer comprising copolymerized units of an intermolecular anhydride of an ethylenically unsaturated $C_3$-$C_{12}$ carboxylic acid, and the polyaddition catalyst being selected from acyclic tertiary amines, alicyclic tertiary amines, N-alkylimidazoles, phosphines and organic metal salts.

16. The microencapsulated polyaddition catalyst according to claim 6, wherein the anion $A^-$ is a carboxylate ion of the formula $R^1-COO^-$, where $R^1$ is selected from H, alkyl, alkenyl, alkynyl, aryl, arylalkyl, alkylaryl, heteroaryl, heteroarylalkyl, alkylheteroaryl and acyl, and where the radical $R^1$ has up to 20 C atoms.

17. The microencapsulated polyaddition catalyst according to claim 6, wherein the anion $A^-$ is an enolate ion of the formula $R^2CH=CR^3-O^-$, where $R^2$ and $R^3$ are each selected from H, alkyl, alkenyl, alkynyl, aryl, arylalkyl, alkylaryl, heteroaryl, heteroarylalkyl, alkylheteroaryl and acyl, and where the radicals $R^2$ and $R^3$ each have up to 20 C atoms.

18. The microencapsulated polyaddition catalyst according to claim 1, wherein the acrylic copolymer is constructed of units of (a) 10 to 30 wt % of at least one intermolecular anhydride of an ethylenically unsaturated $C_3$-$C_{12}$ carboxylic acid, (b) 35 to 80 wt % of at least one monomer selected from $C_1$-$C_{24}$ alkyl esters of acrylic acid, $C_1$-$C_{24}$ alkyl esters of methacrylic acid and vinylaromatics, (c) 10 to 15 wt % of at least one monomer which has at least two ethylenic unsaturations, and (d) 0 to 20 wt % of one or more other monomers, based in each case on the total weight of the monomers.

* * * * *